Figure 1:
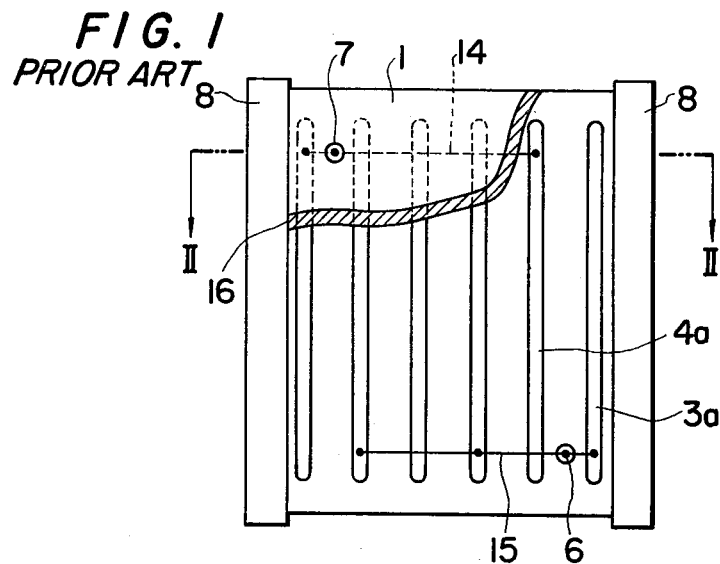

United States Patent [19]
Yamamoto et al.

[11] 4,205,359
[45] May 27, 1980

[54] SAFETY TYPE ELECTRIC FIELD CURTAIN APPARATUS

[75] Inventors: Masahiro Yamamoto, Chiba; Yasunari Okamoto, Tokyo; Tsutomu Itoh, Tokyo; Senichi Masuda, Tokyo, all of Japan

[73] Assignee: Onoda Cement Co., Ltd., Onoda, Japan

[21] Appl. No.: 944,648

[22] Filed: Sep. 21, 1978

Related U.S. Application Data

[63] Continuation of Ser. No. 774,199, Mar. 3, 1977, abandoned.

[30] Foreign Application Priority Data

Mar. 8, 1976 [JP] Japan .................................. 51-024868

[51] Int. Cl.² ............................................... H02H 1/02
[52] U.S. Cl. ...................................... 361/58; 361/226
[58] Field of Search ................... 361/58, 43, 235, 225, 361/226, 229; 55/150, 151

[56] References Cited

U.S. PATENT DOCUMENTS

| | | | |
|---|---|---|---|
| 2,526,763 | 10/1950 | Miller | 361/226 |
| 3,496,413 | 2/1970 | Goodridge et al. | 361/226 |
| 3,551,821 | 12/1970 | Griffey | 361/58 |
| 3,803,453 | 4/1974 | Hull | 361/220 |
| 3,904,929 | 9/1975 | Kanaya et al. | 361/220 |
| 4,029,995 | 6/1977 | Itoh | 361/226 |

Primary Examiner—Patrick R. Salce
Attorney, Agent, or Firm—Price, Heneveld, Huizenga & Cooper

[57] ABSTRACT

A plurality of wire-shaped electrodes are arrayed at equal intervals within a plane insulator layer, and an electric power source for applying an A.C. voltage between adjacent ones of electrodes is connected to the electrodes via protective resistors so that an electric field in a curtain form is established between respective electrodes. The resistance value of the protective resistors between the electric power source and the electrodes and the resistance of the electrodes themselves are respectively selected higher than a minimum A.C. ignition resistance that is necessary for preventing ignition by spark discharge of powder to be processed by the curtain-like electric field. This prevents powder explosion induced by a spark discharge caused by a fault occurring in one part of the electric field curtain.

13 Claims, 15 Drawing Figures

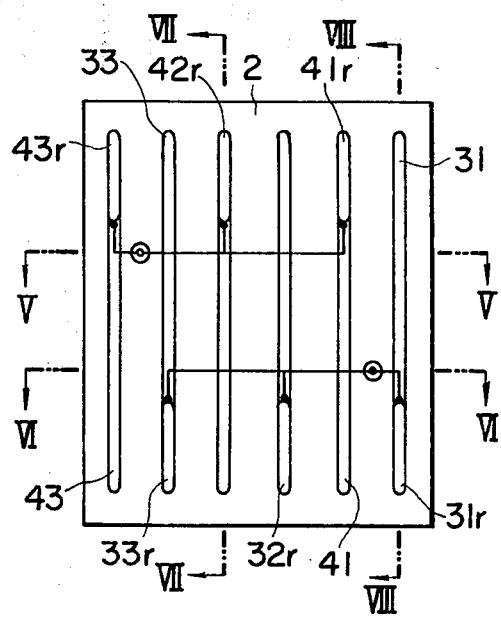
FIG. 4
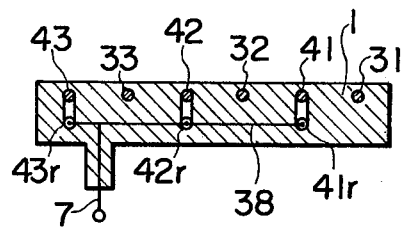
FIG. 5
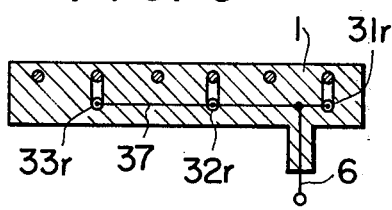
FIG. 6
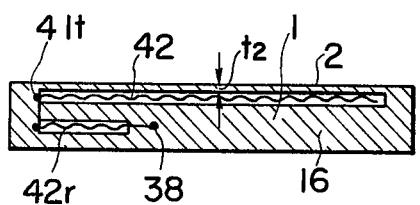
FIG. 7
FIG. 8
FIG. 9
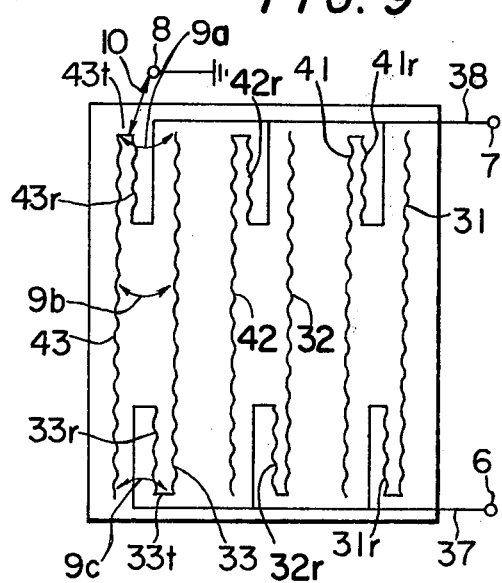

SAFETY TYPE ELECTRIC FIELD CURTAIN APPARATUS

This is a continuation of application Ser. No. 774,199, filed Mar. 3, 1977, and now abandoned.

The present invention relates to safety provision for an electric field curtain apparatus, and according to the present invention, an electric field curtain apparatus is improved by providing resistors in the electric field curtain apparatus in such manner that spark discharge due to a fault having occurred in one part of the apparatus would merely cause local degradation of performance without extending to ignited explosion of powder. A fault thus would scarcely affect overall performance of the apparatus, and that after occurrence of the fault the apparatus can be used while sustaining continuous minute spark discharge within a safety limit for a necessary period of time without disconnecting the part or the whole of the apparatus from an electric power source nor stopping the operation of the apparatus.

It has been already known that an electric field curtain apparatus is generally constructed as described later, and it is being practically developed with respect to its details by the inventors of the present invention. However, there still remains a safety problem in connection to high voltage apparatuses. In most power consuming apparatuses, safety provision of disconnecting a power source, for example, fuses, breakers, etc. is employed, while in power non-consuming apparatuses, upon anomalous rise or the like of a power source voltage, provision such as an arrester is employed. An electric field curtain apparatus is essentially a minute capacitive load. Although in some cases it is used under a load of silent discharge within a limited range. In such cases the capacitive load for the apparatus still remains as its basic load.

An electric curtain apparatus cannot be safe only by making provisions against an excessive voltage according to a general principle for power non-consuming apparatuses. More particularly, in order that an uneven electric field may be effectively established in a space near to adjacent electrodes, the electrodes must be either bare or coated with a very thin insulator layer. Thus, there exists a basic problem in that a spark discharge is readily caused by approach or adhesion of foreign matters thereto or by degradation or damage of the insulator layer. The apparatus according to the present invention deals with floating powder particles where provisions against pulverized dust explosions are essentially necessary.

Naturally, the arrangement and structure of the electrodes is divided so that the value of $CV^2$ [C representing an electrostatic capacity, and V representing an applied voltage] may be reduced to an appropriate amount except for the case where the electrostatic capacity of the apparatus is very small. If the divided unit is too small, then detection for a short-circuit accident would be difficult and counter-measures such as disconnection would be hard to effect even though careful provisions were made, it could not be safe if once short-circuiting or sustaining short-circuits for a short period result in ignited explosion. Furthermore, an excessive resistance would naturally result in degradation of performance.

One object of the present invention is to provide an electric field curtain apparatus in which upon breakdown between the respective parts of the apparatus such as, for example, between electrodes forming the apparatus or between said electrodes and the ground, an ignited explosion accident of a cloud of particles to be processed located at the breakdown portion can be avoided.

Another object of the present invention is to provide an electric field curtain apparatus, in which a minimum resistance that safely allows permanent continuous short-circuiting without causing degradation of overall performance and that permits safe use of the apparatus until an appropriate rest repair time, is verified and provided in the apparatus.

According to one feature of the present invention there is provided a safety type electric field curtain apparatus, in which a plurality of wire-shaped electrodes are embedded within a plane insulator layer at a predetermined depth from its surface in parallel to each other and spaced from each other, an electric power source for applying an A.C. voltage between adjacent ones of said electrodes is connected to said electrodes via protective resistors, and the resistance value of said protective resistor is selected higher than a minimum A.C. ignition resistance value that is necessary for preventing spark ignition of powder to be processed.

Figure 2:
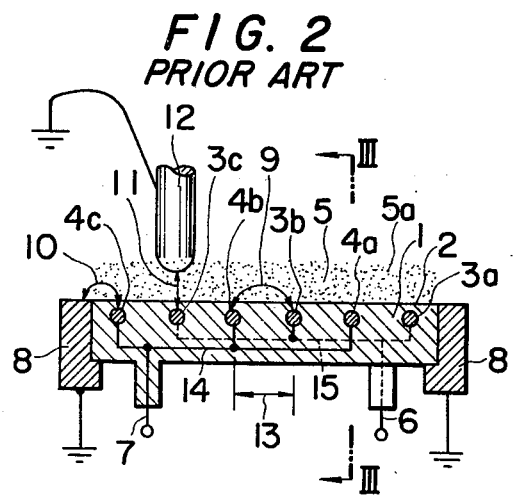
Figure 3:
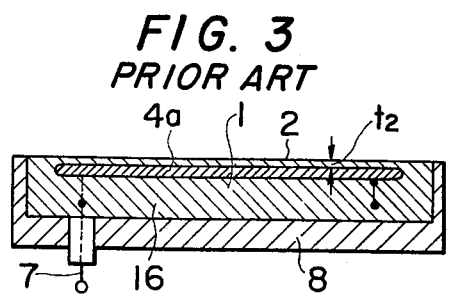
Figure 10:
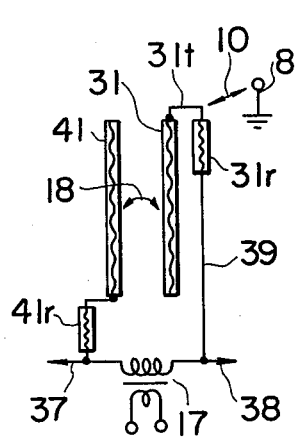
Figure 11:
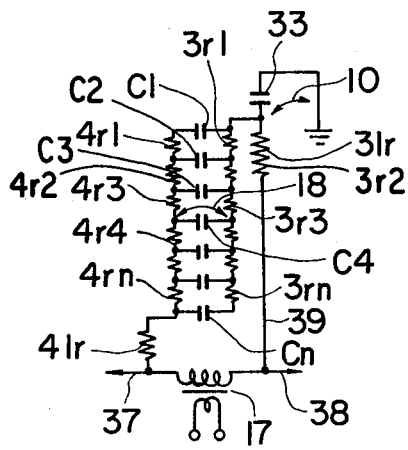
Figure 12:
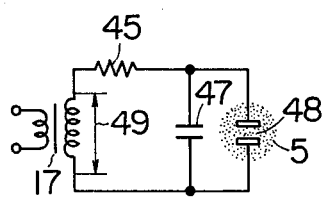
Figure 13:
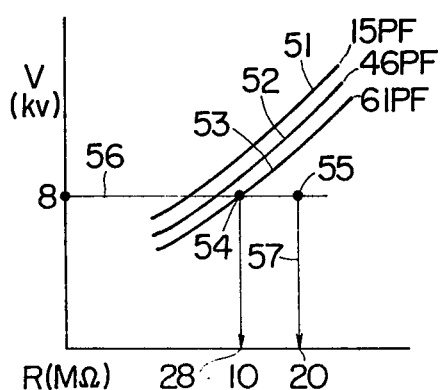
Figure 14:
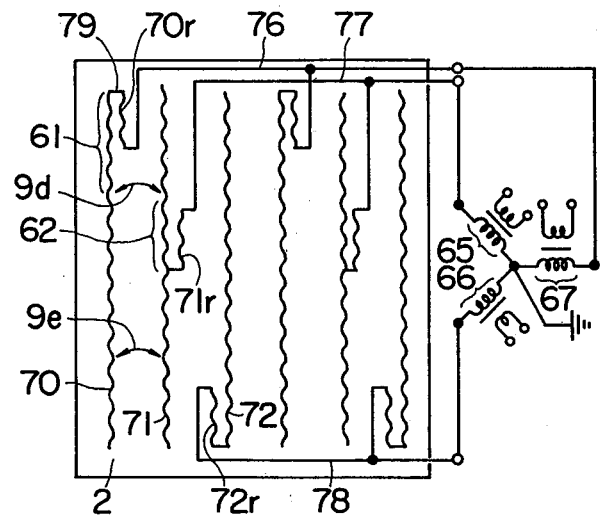
Figure 15:
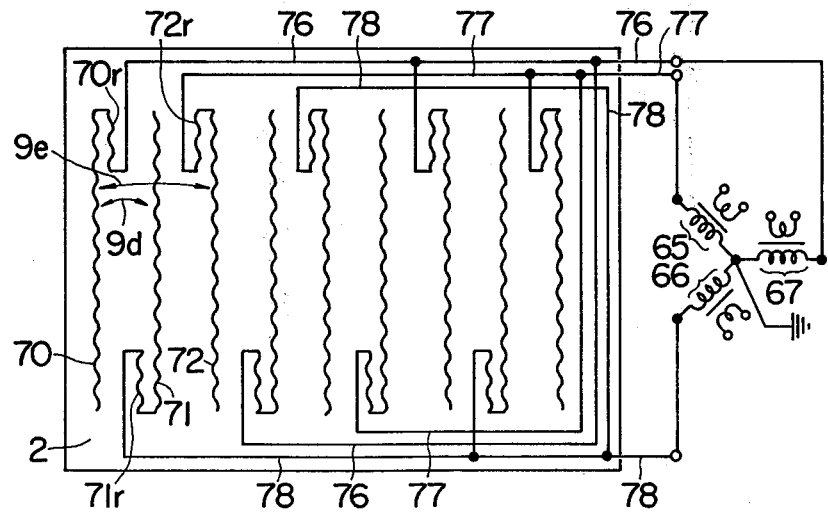

The above-mentioned and other features and objects of the present invention will be better understood by the following description taken in conjunction with the accompanying drawings, in which:

FIG. 1 is a bottom view partly cut away of an electric field curtain device in the prior art, FIG. 2 is a cross-section view taken along line II—II in FIG. 1, FIG. 3 is a cross-section view taken along line III—III in FIG. 2, FIG. 4 is a bottom view partly cut away of a single-phase safety type electric field curtain apparatus according to the present invention, FIG. 5 is a cross-section view taken along line V—V in FIG. 4, FIG. 6 is a cross-section view taken along line VI—VI in FIG. 4, FIG. 7 is a cross-section view taken along line VII—VII in FIG. 4, FIG. 8 is a cross-section view taken along line VIII—VIII in FIG. 4, FIG. 9 is an electric circuit diagram for the apparatus shown in FIGS. 4 to 8, FIG. 10 is a schematic view for explaining an essential part of the apparatus according to the present invention, FIG. 11 is an equivalent circuit diagram for the essential part of the apparatus shown in FIG. 10, FIG. 12 is an equivalent circuit diagram further derived from the circuit shown in FIG. 11, FIG. 13 is a graphical representation of test results obtained in connection with a simplified test apparatus as represented in FIG. 12, FIG. 14 is an electric circuit diagram showing one example of a three-phase safety type electric field curtain apparatus according to the present invention, and FIG. 15 is an electric circuit diagram showing another example of a three-phase safety type electric field curtain apparatus according to the present invention.

While an electric field curtain apparatus can be used in various forms, the construction and operation of the apparatus will be described in connection with a safety type electric field curtain apparatus consisting of a plane rectangular unit or units as illustrated in the accompanying drawings.

Referring now to FIG. 1, a heretofore known electric field curtain apparatus is shown in a plan view as viewed from its back surface. In FIGS. 1 to 3, within an insulator layer 1 are embedded wire-shaped electrodes 3a, 4a, 3b, 4b, 3c and 4c arrayed in parallel to each other at equal intervals in a shallow portion under the surface of the insulator layer. When alternate ones of these electrodes are connected in common and a single-phase A.C. voltage is applied to the respective electrodes via terminals 6 and 7, alternating electric lines of force that bend in an outwardly convex manner from the surface of the insulator layer are established in a space near to the surface of the insulator layer 1, so that charged particles existing in this region 5 oscillate along these outwardly convex electric lines of force. Consequently, the particles would float up as being subjected to repulsive forces from the surface of the insulator layer 1, resulting in a cloud 5 of charged particles in the space 5a near to the surface of the insulator layer 1.

The above-described electric field curtain panel formed by embedding wire-shaped electrodes in a panel formed of an insulator material, has very useful industrial applications such as, for example, use as an inner lining of a booth for electrostatic powder painting in which adhesion of over-sprayed powder can be prevented and a conveying function can be effectively utilized. However, in case that the above-described electric field curtain apparatus is utilized as the inner lining of the electrostatic painting apparatus, fine particles of combustible paint powder having an easily ignitable nature would form a dense cloud 5 of combustible fine powder in the proximity of the surface of the panel due to the repulsive action of the electric field curtain. A power source voltage to be used for an electric field curtain apparatus should desirably be lower than 15,000 V in view of safety of wiring and cost of the apparatus. In order to manufacture an electric field curtain apparatus that can operate effectively with such applied voltages, it is required to select the thickness $t_2$ of the thin insulator layer 2 at the surface of the electric field curtain apparatus normally as thin as 0.5 mm. Accordingly, it is substantially impossible to expect that this thin surface layer 2 should not be mechanically destroyed at all, and in case that this surface layer 2 is subjected to mechanical damage due to collision with falling articles to be painted, there is a risk of generating a spark discharge 10 between the electrodes and a grounded body in the proximity of the electric field curtain apparatus such as, for example, a grounded support frame 8 of the electric field curtain apparatus. In addition upon occurrence of such mechanical damages, if a grounded foreign matter should approach to the damaged surface, then a spark discharge 11 would arise between that foreign matter and the electrodes, and if the damages of the surface layer 2 should arise simultaneously at the surface portions of two electrodes of different phases, then there would be a risk of generating spark discharge 9 between these electrodes. When such spark discharge has occurred, if a density of the powder paint particle cloud 5 existing in the proximity of the surface is within a limit of explosive ignition, then ignited explosion would occur at once, resulting in a great accident. Such kind of problems have existed where combustible particles are processed in an electric field curtain apparatus, and unless counter-measures are made for the purpose of processing combustible fine particles in the electric field curtain apparatus, it is quite impossible to practically use the electric field curtain apparatus as an industrial apparatus. Nevertheless, in the heretofore known electric curtain apparatuses, no provision has been made with respect to this point. The present invention relates to an electric field curtain apparatus having essential safety, in that with such feature the risk of ignited explosion of fine particles which would occur when combustible fine particles are processed in an electric curtain apparatus as fully described above can be prevented by a very simple method.

One preferred embodiment of a single-phase electric field curtain apparatus according to the present invention is shown in FIGS. 4 through 9, in which FIG. 4 is a back side view of the single-phase electric field curtain apparatus having an insulator layer mostly cut away with only a surface layer portion thereof retained. As shown in these figures, electrodes to be embedded in the neighborhood of the surface of the insulator layer 1 are embedded at equal intervals at a substantially constant depth $t_2$ (See FIGS. 7 and 8) from the surface. They are grouped into one group consisting of alternate electrodes 31, 32 and 33 and the other group consisting of the other alternate electrodes 41, 42 and 43, electrodes in one group being connected at one ends to protective resistors 31r, 32r and 33r, electrodes in the other group being connected at one ends on the opposite side to separate protective resistors 41r, 42r and 43r. The respective protective resistors are embedded in a mechanically rigid insulator layer 16 have a sufficient thickness on the back side of the electrodes within the insulator layer 1, and the other ends of the protective resistors opposite to the electrodes are connected to voltage feed terminals 6 and 7, respectively, via lead wires 37 and 38, whereby a single-phase A.C. high voltage can be applied to the electrodes via the protective resistors. It is to be noted that in the electric field curtain apparatus according to the present invention, the electrodes 31, 32, 33, 41, 42 and 43 are formed of resistors having a high resistance that is appropriately selected by a method according to the present invention as will be described later in detail. The protective resistors 31r, 32r, 33r, 41r, 42r and 43r are also formed of resistors having another high resistance that is determined by a method according to the present invention as will be described later in detail. The lead wires 37 and 38 are normally made of conductors. While the electrodes and the protective resistors are, in some cases, formed separately and then connected via lead wires as shown in FIG. 7, they could be formed integrally of identical electrode material as shown in FIG. 8.

From the reasons as described in detail below, the electric field curtain apparatus according to the present invention forms an essentially safe type of electric field curtain apparatus in which any breakdown that can occur in practice, ignited explosion and electric shock accidents would never arise. More particularly, breakdown accidents occurring in an electric field curtain apparatus are generally classified into breakdowns occurring between electrodes of different phases and short-circuiting accidents occurring between respective electrodes and bodies which are substantially grounded with respect to a high voltage. In the case of these breakdown accidents, in any electric field curtain apparatus in the prior art, spark discharge would occur between the respective electrodes or between the electrode and the grounded bodies, and the accident resulting when this spark discharge induces ignited explosion of a cloud of fine particles to be processed, could not be avoided. However, in the electric field curtain apparatus according to the present invention, upon a short-circuiting accident occurring between the electrodes, since the amount of energy released at the short-circuit point is made always smaller than the ignition energy of the cloud of fine particles to be processed by appropriately selecting voltage feed points for the electrode groups of different phases and constructing the electrodes themselves with high resistance electrode materials according to the present invention as will be explained in detail in the followings, the ignited explosion accidents can be prevented.

More particularly, with reference to FIG. 9, a voltage feed point for the electrode 43 is selected at 43$t$, whereas the voltage feed point 33$t$ for the electrode 33 of different phase is selected at a point on the opposite side that is most remote from the voltage feed point 43$t$ for the electrode 43. Accordingly, when a short-circuiting accident has occurred between the electrodes 33 and 43, for instance, if this short-circuiting accident has been generated at a short-circuit point 9$a$ that is nearest to the voltage feed point 43$t$ for the electrode 43, then since the energy released at this short-circuit point 9$a$ is limited by the current-limiting effect of the current-limiting resistance consisting of the series connection of the electrode 43 and the protective resistors 33$r$ and 43$r$, provided that the resistance values of these electrode and protective resistors are selected so as to keep the energy released at the short-circuit point 9$a$ well smaller than the ignition energy of the powder to be processed, an ignited explosion accident at the short-circuit point 9$a$ can be prevented. Likewise, in case that a short-circuiting accidence has been generated at a short-circuit point 9$c$ near to the voltage feed point 33$t$ for the electrode 33, since the energy released at this short-circuit point 9$c$ is limited by the current-limiting effect of the current-limiting resistance consisting of the series connection of the electrode 43 and the protective resistors 33$r$ and 43$r$, by appropriately selecting the resistance values of these electrode and protective resistors, an ignited explosion accident of the powder to be processed at the short-circuit point 9$c$ can be prevented. Similarly, in case that a short-circuiting accident has occurred at a short-circuit point 9$b$ that is any arbitrary midpoint on the electrodes 33 and 43, then the series connection of all the resistance of the electrode 33 from the voltage feed point 33$t$ to the short-circuit point 9$b$, the resistance of the electrode 43 from the short-circuit point 9$b$ to the voltage feed point 43$t$, and the resistance of the protective resistors 33$r$ and 43$r$, serves as a current-limiting resistance for limiting electric energy released at the short-circuit point 9$b$. Since the electric resistances of the respective electrodes are normally selected equal, the amounts of electric energy released at the respective short-circuit points in the cases of the above-described three short-circuiting accidents are equal to each other, and the values of the current-limiting resistances in these case are always equal to the sum of the resistances of either one entire electrode and the protective resistors for the respective electrodes. Accordingly, if the apparatus is constructed as described above, and if resistance values as fully described later are selected for the respective electrodes and respective protective resistors, then the energy released upon a short-circuiting accident occurring between the respective electrodes is prevented from inducing ignited explosion of fine particles to be processed.

With regard to prevention of short-circuiting accidents occurring between the electrodes and the grounded bodies, the most dangerous accident is a short-circuiting accident occurring between a grounded point and a voltage feed point for the electrode where the resistance of the electrode itself cannot be expected to serve as a current-limiting resistance, which results in ignited explosion. More particularly, with reference to FIG. 9, such kind of short-circuiting is a spark discharge 10 occurring between the voltage feed point 43$t$ for the electrode 43 and the grounded body 8. The electric energy released at such location is limited to a value smaller than the minimum ignited explosion energy of the fine particles to be processed by the current-limiting effect of the protective resistor 43$r$ whose resistance value is determined by a method according to the present invention as fully described later. In case of a short-circuiting accident occurring between any arbitrary point on the electrode 43 other than the voltage feed point 43$t$ and the grounded point, in addition to the protective resistor 43$r$ the electric resistance of the electrode 43 itself from the voltage feed point 43$t$ to the short-circuit point also serves as a current-limiting resistance, so that the induction of an ignited explosion accident caused by the short-circuiting accident of the electrode to the grount may be more surely prevented.

Now the method for determining the resistance values of the protective resistors and electrodes to be used in the electric field curtain apparatus according to the present invention, will be explained in detail. FIG. 10 shows an extracted essential part of wiring for adjacent electrodes of different phases and their protective resistors in an electric field curtain apparatus according to the present invention. In addition, an equivalent circuit diagram for the circuit portion of the electrode system illustrated in FIG. 10, is shown in FIG. 11. More particularly, with reference to FIG. 11, the adjacent two electrodes 31 and 41 in FIG. 10 are respectively divided into minute electrical resistance portions represented by 3$r$1, 3$r$2, ... 3$rn$ and 4$r$1, 4$r$2, ... 4$rn$, respectively. Minute electrostatic capacities C1, C2, C3, ... Cn obtained by dividing an electrostatic capacity between the electrodes 31 and 41 into n parts, are connected between the respective pairs of the above-described minute electrical resistance portions 3$r$1–4$r$1, 3$r$2–4$r$2, ... 3$rn$–4$rn$, and an electrostatic capacity 33 represents a capacity to the ground of the electrode 31. A voltage is applied from one pole of an electric power source 17 through lead wires 38 and 39 and a protective resistor 31$r$ to the electrode 31, and also from the other pole of the electric power source 17 through a lead wire 37 and a protective resistor 41$r$ to the electrode 41. Now, the decision of the desired resistance value for the protective resistor 31$r$ according to the present invention is carried out in the following manner. That is, when short-circuit as represented by spark discharge 10 has occurred from the voltage feed point 31$t$ of the electrode 31 to the ground 8, it is only necessary to determine the resistance value of the protective resistor 31$r$ so that the electric energy released at this short-circuit point may become smaller than the ignition energy of the cloud of fine particles to be processed which exist in the neighborhood of the short-circuit point. Picking up only such circuit portion in the equivalent circuit shown in FIG. 11 that directly concerns the aforementioned problem, the equivalent circuit for that portion is represented by the schematic circuit diagram in FIG. 12. In this figure, a power source 17 applies a voltage to an electrostatic capacity 47 via a resistance 45, a spark gap 48 being provided in parallel to this electrostatic capacity 47, and a cloud of fine particles 5 to be processed exists in the proximity of the spark gap 48. In this circuit, the electrostatic capacity 47 represents the electrostatic capacity to the ground of the electrode 31, the resistance 45 represents the resistance of the protective resistor 31r for the electrode 31, and the spark gap 48 represents the gap space of the spark discharge 10 generated from the voltage feed point 31t for the electrode 31 towards the grounded body 8. In prior art A.C. circuits of this type, it has not been known how the values of the electrostatic capacity 47 and the resistance 45 affect the value of the A.C. applied voltage 49 which causes ignition of the cloud of combustible fine particles 5 existing in the proximity of the spark gap 48. The inventors of this invention have experimentally investigated this problem, and have completed the present invention on the basis of the knowledge obtained that is practically necessary and sufficient for determining the value of the protective resistor to be used in the electric field curtain apparatus according to the present invention.

More particularly, an experimental device having the circuit shown in FIG. 12 was prepared, and by means of this device, experiments for determining the above-mentioned values were conducted. With regard to the cloud of fine particles 5 to be processed, a state where the particles are well dispersed and confined at a density having the highest possibility of ignition, was realized by means of an electric field curtain apparatus, and the spark gap 48 for test use was disposed at a part of the electric field curtain apparatus. With respect to various combinations of the electrostatic capacity 47, the electric resistance 45 and an applied voltage 49, whether or not ignited explosion of the cloud of fine particles 5 to be processed at the spark gap 48 occurs, was tested, and the test results were graphically represented in FIG. 13. In this figure, the resistance value R in megohms (MΩ) of the resistance 45 in FIG. 12 is taken along an abscissa, while the voltage value V in killovolts (KV) of the voltage 49 applied by the power supply 17 in FIG. 12 is taken along an ordinate, and three lines plotted on this R-V plane represent boundary lines with respect to the respective parameter values of the electrostatic capacity 47 showing that on the upper side of the respective lines, ignition of the cloud of fine particles 5 to be processed (in this case, acryl series granular paint having an average grain diameter of 30μ) always occurs, whereas under these lines, ignition of the cloud of fine particles 5 to be processed does not occur. Since the value of the capacity to the ground normally possessed by a single electrode in a practical electric field curtain apparatus exists in the range of about 5–100 pF, the examples of the experimental results for the test device shown in FIG. 12 are represented by curves 51, 52 and 53 in FIG. 13 in connection to the representative examples of experiments in which the value of the electrostatic capacity was selected at 15 pF, 45 pF and 61 pF, respectively. In the cloud of fine particles 5 to be processed that has been adjusted to a predetermined ignitable density by means of an electric field curtain apparatus not shown, the respective fine particles are charged, and also owing to the electric field of the electric field curtain apparatus, they are carrying out very active motions in the confined space. Therefore, the experimental results obtained by the test device shown in FIG. 12 have very high reproducibility, and so, extremely reliable experimental results can be obtained.

The method for determining the resistance value of the protective resistor 31r shown in FIG. 11 on the bases of the experimental results shown in FIG. 13 which were obtained by means of the test device illustrated in FIG. 12, will now be explained in detail. At first, let us assume that the maximum value of the voltage applied to the electrode of the electric field curtain apparatus with respect to the ground is 8 KV. In case that the electrostatic capacity to the ground of the electric field curtain apparatus, that is, the electrostatic capacity 47 or 33 has a value within the range for practical capacity values of 15–16 pF as illustrated in FIG. 13, the resistance value R of the resistance 45 (or the protective resistor 31r) must be selected so that an electrode with such an electrostatic capacity cannot ignite the cloud of fine particles 5 to be processed at the spark discharge gap 48. Therefore, in FIG. 13 a horizontal line 56 is drawn from the point on the ordinate representing the applied maximum voltage of 8 KV, and a vertical line is drawn downwardly towards the R-axis from a cross point 54 between the horizontal line 56 and the lowest curve 53 among the curves 51, 52 and 53 which correspond to the electrostatic capacities to the ground of 15 pF, 46 pF and 61 pF, respectively. Then, the value 28 of the resistance R obtained at the crosspoint between the aforementioned vertical line and the R-axis, represents the minimum resistance which will possibly ignite the cloud of fine particles to be processed. This resistance is called, throughout this specification, "a minimum A.C. ignition resistance". With reference to FIG. 13, the minimum A.C. ignition resistance for the powder particles to be processed under the given condition is 10 MΩ. In other words, in the electric field curtain apparatus for processing these powder particles, when spark discharge has been generated due to short-circuiting from one electrode of the electric field curtain apparatus to be grounded body, the minimum resistance value required for preventing the spark discharge from inducing ignited explosion of the fine particles to be processed, is equal to 10 MΩ. If the resistance value of the protective resistor 31r is smaller than this minimum resistance value, then ignited explosion of the cloud of fine particles 5 to be processed may possibly occur in the spark gap 48 shown in FIG. 12, whereas if the resistance value of the protective resistor 31r is larger than this minimum resistance value, the explosion of the cloud of fine particles 5 to be processed would not arise regardless of whatever value in the range of 15 to 61 pF the electrostatic capacity to the ground 33 may take. Taking into account a certain safety factor, for example, taking a safety factor of 2 in this case, when a protective resistor 31r of 20 MΩ is employed, it can be assured that practically there is no possibility of occurrence of ignited explosion of the fine particles to be processed in the spark gap 48. In this way, under the condition of a given voltage applied to the electric field curtain apparatus and a given value of the electrostatic capacity to the ground possessed by a single electrode in the electric field curtain apparatus, upon a short-circuiting accident occurring between the electric field curtain electrode and a grounded body, it becomes possible to prevent ignited explosion of powder particles to be processed. As described above, by feeding voltages to the voltage feed points of the respective electrodes which are physically arrayed as shown in FIGS. 5 to 9 through the protective resistors whose resistance values are selected according to the above-mentioned procedures, it becomes possible to substantially perfectly prevent ignited explosion of a cloud of fine particles to be processed upon a short-circuiting accident between a ground body and a voltage feed point for an electrode in the electric field curtain apparatus according to the present invention.

Now a method for obtaining a resistance value to be possessed by the electrode itself as a provision against inter-electrode short-circuiting caused by an electrostatic capacity between adjacent electrodes, will be described. However, if the obtained resistance value is lower than the effective resistance value of the protective resistor against grounding as described previously, then there is no need to make the electrode have a resistance in itself. That is, the protective resistor against grounding also serves as a protective resistor connected in series upon spark discharge between electrodes, so that when the electrodes themselves are made to have a resistance, a part of the necessary resistance can be borne by the protective resistors against grounding.

In case that the resistance value obtained on the basis of the inter-electrode capacity is larger than the resistance value obtained on the basis of the capacity to ground, when the former resistance value is employed as a reference value for the protective resistor against grounding, then safety can be assured even with electrodes made of good conductors.

Now a detailed description according to the present invention is presented for ascertaining the resistance value electrodes to prevent ignited explosion of a cloud of fine particles to be processed that might be caused by short-circuiting generated between the electrodes. With reference to FIG. 11, in case that short-circuiting 18 has occurred between electrodes 31 and 41 of different phases midway of these electrodes, the energy released at this short-circuit point 18, is at first the electrostatic energy stored in the minute electrostatic capacity C4 in the neighborhood of the short-circuit point 18 among the distributed electrostatic capacities C1, C2 . . . Cn between the electrodes 31 and 41, subsequently energy is released at the short-circuit point 18 due to spark discharge caused by an A.C. voltage fed from the power source 17 through the composite resistance consisting of the minute resistances $3r1$ to $3r3$ and $4r4$ to $4rn$ of the respective portions of the both electrodes 31 and 41 connected in series to this minute electrostatic capacity C4. Thereby an ignited explosion is induced in the cloud of fine particles to be processed which exists in the neighborhood of the short-circuit point 18. However, in this case it is assumed that the protective resistors $31r$ and $41r$ do not exist between the power source 17 and the respective electrodes. Under the above-described assumption, it doesn't matter if the further assumption is made such that the distributed electrostatic capacities C1, . . . , C4, . . . , Cn existing between the respective electrodes 31 and 41 have been all joined to the electrostatic capacity C4 as connected in parallel thereto without any intermediate resistance, because of the resistance value of the electrode. Therefore, in case that short-circuiting has occurred between the electrodes 31 and 41 at the short-circuit point 18 in FIG. 11, in the equivalent model for determining the electrical resistance to be possessed by these electrodes themselves in order to prevent this short-circuiting from inducing ignited explosion of the fine particles to be processed, the value of the resistance 45 in FIG. 12 could be considered to be equal to the sum of the minute resistances $3r1+ \ldots +3r3+4r4+ \ldots +4rn$ in FIG. 11, and the value of the electrostatic capacity 47 could be considered to be equal to the total electrostatic capacity between the respective electrodes 31 and 41. Therefore, it is a basic inventive concept of the present invention that at first the effect of the combination of the voltage 49 applied from the power source to the electrodes, the resistance 45 and the electrostatic capacity 47 upon ignition of the cloud of fine particles 5 being processed by the electric field curtain apparatus, is explored, and on the basis of the knowledge obtained by the exploration an appropriate combination of the applied voltage 49, the resistance 45 and the electrostatic capacity 47 could be selected.

Since the above-mentioned equivalent model is the same as that used previously in the case of determining the resistance value of the protective resistor $31r$ of safety purpose for preventing ignition of the cloud of fine particles to be processed upon short-circuiting accidents across the electrostatic capacity to the ground of one electrode in the electric field curtain apparatus, the minimum value of the resistance 45, that is, the resistance of the electrode itself called "minimum A.C. ignition resistance" can be obtained by the same method as that explained previously. Therefore, by selecting the resistance of the electrode itself higher than this minimum A.C. ignition resistance value, in the electric field curtain apparatus according to the present invention, ignition of the cloud of fine particles to be processed caused by short-circuiting arising between its electrodes can be prevented. In this case, as will be obvious from FIG. 11, since it can be assumed in practice that the short-circuiting 18 between the electrodes is generated in the proximity of a minimum distance between the respective electrodes, at whatever position on the electrodes the short-circuiting 18 may occur, the value of the electric resistance 45 in FIG. 12 is the same as the resistance value of one electrode. Accordingly, the minimum A.C. ignition resistance value itself available from FIG. 13 multiplied by an appropriate safety factor in view of the remaining conditions not taken into account, could be employed as the resistance of the electrode itself.

As described in detail above, in the electric field curtain apparatus according to the present invention, it becomes possible to substantially perfectly prevent ignition of a cloud of fine particles to be processed that is caused by short-circuiting accidents between voltage feed points and grounded bodies and short-circuiting accidents between electrodes, by determining a resistance value of protective resistors for the respective electrodes and a resistance value to be possessed by the electrodes themselves according to the method described in detail above, and by appropriately selecting the physical arrangement of the voltage feed points for the respective electrodes. In the above-described case, it is obvious from the detailed explanation above that speaking from a view point of basic safety, if the length of the electrodes is very short and thus the value of the electrostatic capacity existing between the respective electrodes is very small, ignited explosion of the cloud of fine particles to be processed can be prevented by the protective resistors for the respective electrodes. However, if the length of the electrodes is longer than a certain extent, it is very effective for the operation of the electric field curtain apparatus to make the electrodes themselves have an electric resistance as determined by the above-described method. In case that the electrodes themselves are not made to have a resistance, upon occurrence of breakdown the electric field between the electrodes that concern the breakdown will perfectly and entirely disappear and thereby the function of the electric field curtain is lost over the entire length of these electrodes. Whereas, in an electric field curtain apparatus in which the electrodes themselves are made to have an electric resistance, lowering of a voltage difference between adjacent electrodes will occur only in the proximity of the point of the short-circuiting accident without affecting on the entire electrodes, so that the degradation of performance of the electric field curtain caused by the short-circuiting accident can be confined to an extremely small region, and this is a practically very advantageous effect of the present invention.

In the electric field curtain apparatus according to the present invention, in principle, the protective resistors are normally disposed with sufficient safety at such portions of a thick insulator layer on the rear side of the electrodes that both mechanically and electrically quite ample protecting and insulating capabilities can be expected. In practice, while the resistance value of the protective resistors can be selected at a high value to serve as a sufficiently large current-limiting resistance for the purpose of preventing an electric shock accident at the voltage feed points, the prevention of the electric shock accident can be expected more perfectly by making the electrodes themselves have an electric resistance. In addition, an electric field curtain apparatus according to the present invention in which a resistance value higher than the minimum A.C. ignition resistance is employed for the protective resistors and the electrodes, is not inferior in the function of an electric field curtain apparatus, to an electric field curtain apparatus in which electrodes made of substantially conductive material showing no electrical resistance of the electrodes are used, in case that the length of the electrodes is of the order of several tens of centimeters.

Now one example of applications of the present invention to a multi-phase alternate current will be described in detail in connection to electric field curtain apparatuses employing a three-phase A.C. power source. In the electric field curtain apparatus according to the invention, in case that a single-phase A.C. power source is employed, if the A.C. power source is used always with one lead wire grounded, then protective resistors having a predetermined resistance value could be connected only between the power source lead wire on the ungrounded side and the associated electrodes without connecting the protective resistors between the power source lead wire on the grounded side and the remaining electrodes. However, in order that the apparatus can be used with either side of the power source grounded, generally it is more favorable to provide two protective resistors to be connected to the respective power source lead wires as shown in FIGS. 9 to 11. Accordingly, although not remarked previously, in the preceding explanation on the operation of the circuits shown in FIGS. 10 and 11, it was assumed that the terminal of the power source 17 connected to the lead wire 37 was grounded.

FIG. 14 is a schematic view similar to FIG. 7 of an electric field curtain apparatus according to the present invention which is energized from a three-phase A.C. power source 65, 66, 67, as viewed from the back side of the electric field curtain apparatus, paying attention to the physical arrangement of the voltage feed points for the electrodes and the electrical connections. In the three-phase electric field curtain apparatus according to the present invention illustrated in FIG. 14, electrodes separated by two other electrodes are connected in common, and thus all the electrodes are divided into three phases. Voltage feed points for the electrodes in the phase to be connected to a lead wire 76 are selected at the top ends of the electrodes as viewed in FIG. 14. Voltage feed points for the electrode group to be connected to a lead wire 77 are selected substantially at middle points of the length of the electrodes, and voltage feed points for the electrode group to be connected to a lead wire 78 are selected at the bottom ends of the electrodes. The electric resistance of the respective electrodes is selected so that a resistance twice as large as the value of the minimum A.C. ignition resistance which is determined from FIGS. 12 and 13 on the basis of the highest applied voltage to be applied to the respective electrodes according to the present invention, may be reserved as a resistance value across each electrode. If such provision is made, in case that a short-circuiting accident $9d$ has occurred, for example, between electrodes 70 and 71, the amount of electric energy released at this short-circuit point $9d$ is limited by electric resistances 61 and 62 even if the existance of protective resistors $70r$ and $71r$ for voltage feed purpose should be disregarded. Since the sum of the electric resistances 61 and 62 is larger than the minimum A.C. ignition resistance, induction of ignited explosion of the cloud of fine particles to be processed caused by the short-circuiting accident $9d$ can be prevented substantially perfectly. The above-mentioned short-circuiting condition with respect to the electrodes 70 and 71 is equally the worst condition when the short-circuiting accident $9d$ occurs at any point between the voltage feed points for the electrodes 70 and 71, respectively, but when a short-circuiting accident $9e$ occurs on the downside of the voltage feed point for the electrode 71, there is no problem because the situation becomes safer.

Now description will be made in detail of the selection of the resistance value of the protective resistors for voltage feed purpose. With respect to the three-phase sinusoidal A.C. power source 65, 66, 67 illustrated in FIG. 14, a voltage with respect to the ground generated by the power source branch 67 for feeding a voltage to the electrode 70 is equal to $\sqrt{\frac{1}{3}}$ times as small as the phase voltage applied between the electrodes 70 and 71, and therefore, it is only necessary to employ a protective resistor $70r$ which has a larger value than the value of the minimum A.C. ignition resistance to be determined according to the present invention on the basis of this smaller voltage. This relation is exactly the same with respect to the protective resistors $71r$ and $72r$. Thus it can be seen that in general in the case of multi-phase A.C. power sources the resistance value of the protective resistors can be selected smaller than the minimum A.C. ignition resistance that is required for the resistance value of the electrodes themselves.

In another preferred embodiment of the three-phase electric field curtain apparatus according to the present invention illustrated in FIG. 15, the arrangement of the electrodes and voltage feed points can be modified in such manner that the voltage feed points for the respective electrodes are positioned at either ends of the electrodes and with respect to adjacent two electrodes the voltage feed points are always positioned at the opposite ends of the respective electrodes. The three-phase electric field curtain apparatus of the type shown in FIG. 15 has a high safety with regard to a short-circuiting accident 9d occurring between adjacent electrodes 70 and 71. However, possibly a short-circuiting accident 9e between alternate electrodes 70 and 72 may likewise occur upon falling of an article on the surface of the electric field curtain, and upon such short-circuiting accident, in some cases the safety effect possessed by the electrode resistance may become zero, so that it becomes meaningless to make the electrodes have an electric resistance. Although the probability of occurrence of short-circuiting accidents of the type shown at 9e is very small in comparison to the short-circuiting accidents 9d occurring between adjacent electrodes, generally speaking the three-phase electric field curtain apparatus according to the present invention of the type shown in FIG. 14 has a higher safety than the three-phase electric field curtain apparatus according to the present invention shown in FIG. 15.

Similarly to the case of the single-phase apparatuses, in the three-phase electric curtain apparatus according to the present invention, too, in a certain mode of connection for the power source, the protective resistors are theoretically unnecessary for an electrode group that is fed with power in a particular phase. However, in this case, a higher voltage is applied to the electrode groups of the other phases, and consequently, the protective resistors of the other phases must have a correspondingly larger resistance value. Thus the versatility of the electrode connection is lost. Therefore, in principle, often it is more convenient to provide the protective resistors for the respective electrodes as shown in FIGS. 14 and 15.

In the case of an electric field curtain apparatus according to the present invention having a larger number of phases than three phases, it is only necessary to prepare the characteristic curves as shown in FIG. 13 by means of a test device as shown in FIG. 12 on the basis of the voltages applied between the respective phases and the voltages applied between the respective phases and the ground point similarly to the process explained above in connection to three-phase apparatuses, and to select a resistance higher than the minimum A.C. ignition resistance determined by this process as the resistance values of the electrodes and the protective resistors. Then, from the same reasons as described above in connection to the single-phase and three-phase apparatuses, a multi-phase electric field curtain apparatus according to the present invention can be readily made an essentially safe apparatus.

In general, with regard to the protective resistors at the voltage feed points in the electric field curtain apparatus according to the present invention, in case that the electrostatic capacity between different phases is not so large and the capacity to the ground of each phase has such a small capacity value that the electrostatic energy stored in that capacity is smaller than a D.C. ignition energy, then it is possible to provide a single protective resistor for voltage feed use in common to a number of electrodes in the same phase according to the method specified in detail by the present invention. However, in such cases, a dangerous situation will be resulted if the short-circuiting accidents between the electrodes and the short-circuiting accidents between the voltage feed point and the ground should arise at more than one locations, and therefore, it is normally more favorable to provide the protective resistors for voltage feed use for the respective electrodes.

In an electric field curtain panel to be used for a conventional purpose such as the use as an inner lining of an electrostatic powder painting booth, an electric field curtain electrode material having an electric resistance of several hundreds KΩ to several MΩ per centimeter and a diameter of 1 mm or less, is required for the electrodes and the protective resistors. It is easy to obtain a resistive material having such degree of resistance by mixing an appropriate conductive material such as, for example, carbon powder, carbon fibers or metallic powder in an appropriate plastic material such as, for example, polyethylene, vinyl chloride, or others. In practice, electrodes and protective resistors for use in an electric field curtain apparatus which are favorable for the electric field curtain apparatus according to the present invention, can be readily obtained according to the above-mentioned method.

One preferred embodiment of the electric field curtain apparatus according to the present invention will be described. Conductive plastic electrodes having a diameter of 0.5 mm and a resistance of 1 MΩ per 1 cm were embedded in a plastic plate of 10 mm in thickness at a depth of 0.5 mm from its surface, and a single-phase A.C. voltage of 10 KV was applied to these electrodes. Also, protective resistors made of the same material as the electrodes and having a resistance value determined according to the present invention, were embedded in the rear side portion of the plastic plate so as to have a sufficient mechanical strength. In the electric field curtain apparatus according to the present invention constructed in the above-described manner, the surface of the plastic plate on the electrode side was drilled, or the same surface of the plastic plate was damaged during operation of the apparatus as by making an article fall onto the same surface of the plastic plate. Also, a voltage was applied to the electrodes to make a sufficient density of fine particles of acryl-series electrostatic powder paint float above the surface and repelled from the surface by the electric field curtain effect. Then ignition of the powder particles was not acknowledged at all, although occurrences of weak spark discharge between the electrodes and between the electrode and grounded bodies were observed. Thus, the excellent safety of the electric field curtain apparatus according to the present invention was verified. In addition, with regard to the performance as an electric field curtain apparatus, it has been proved that the performance is almost identical to that of an electric field apparatus in which the protective resistors are not employed and the electrodes are made of conductors of the same shape. Furthermore, it has been proved that in contrast to the fact that the electric field curtain apparatus employing electrodes made of conductors would become inoperable as a whole as soon as breakdown occurs, the electric field curtain apparatus according to the present invention has a very remarkable advantage in that upon breakdown it can be continuously and safely used with only a small portion of 1 cm² around the breakdown point degraded in performance.

Since many changes could be made in the above construction and many widely different embodiments of this invention could be made without departing the scope thereof, it is intended that all matter contained in the above description or shown in the accompanying drawings shall be interpreted as illustrative and not in a limiting sense.

What is claimed is:

1. A safety type electric field curtain apparatus comprising:
- a planar insulating layer;
- a plurality of wire-shaped electrodes embedded within said planar insulating layer at a first predetermined depth from the surface of said layer, said electrodes being parallel to and spaced from each other;
- a plurality of protective resistors, each of said protective resistors being coupled in series with one of said electrodes, said protective resistors being embedded in said layer at a second predetermined depth greater than said first predetermined depth, said second predetermined depth being sufficient to prevent grounded body spark ignition of an explosive powder to be processed by a short involving one of said protective resistors, each of said protective resistors having a predetermined resistance value higher than a first minimum A.C. ignition resistance value necessary for preventing spark ignition of an explosive powder to be processed due to grounded body arcs;
- a plurality of terminals for coupling an A.C. high voltage power source to said electrodes for generating a silent discharge between adjacent electrodes and establishing an electric field curtain adjacent the surface of said insulating layer;
- said electrodes having a ground capacitance with respect to ground and an interelectrode capacitance between adjacent electrodes; and
- said first minimum A.C. ignition resistance having a value determined by applying the maximum voltage to be used with said ground capacitance to an equivalent circuit, dispensing the explosive powder to be processed in a spark gap connected in parallel with said ground capacitance, and adjusting a test resistance in series with said ground capacitance until the powder is no longer ignitable, the value of said test resistance being said first minimum A.C. ignition resistance for preventing grounded body arc ignition of an explosive powder to be processed.

2. The safety type electric field curtain apparatus of claim 6 wherein the electrostatic energy stored in said ground capacitance is greater than the electrostatic energy stored in said interelectrode capacitance and said protective resistors also prevent interelectrode arc ignition of the explosive powder to be processed.

3. The safety type electric field curtain apparatus of claim 6 wherein each of said electrodes is provided with a predetermined resistance value extending over the entire length of each of said electrodes, said predetermined resistance value being higher than a second minimum A.C. ignition resistance necessary for preventing interelectrode arc ignition of the explosive powder to be processed, said second minimum A.C. ignition resistance having a value determined by applying the maximum voltage to be used with said interelectrode capacitance to an equivalent circuit, dispersing the explosive powder to be processed in a spark gap connected in parallel with said interelectrode capacitance, and adjusting a test resistance in series with said interelectrode capacitance until the powder is no longer ignitable, the value of said test resistance being said second minimum A.C. ignition resistance for preventing interelectrode arc ignition of an explosive powder to be processed.

4. The safety type electric field curtain apparatus of claim 7 wherein first and second terminals are provided for connecting said electrodes to a single phase A.C. power source, said electrodes including opposed first and second ends, said first ends of alternate electrodes being connected to said first terminal with one of said protective resistors therebetween, and said second ends of the remaining electrodes being connected to said second terminal with one of said protective resistors connected in series therebetween.

5. The safety type electric field curtain apparatus of claim 8 wherein first and second terminals are provided for connecting said electrodes to a single phase A.C. power source, said electrodes including opposed first and second ends, said first ends of alternate electrodes being connected to said first terminal with one of said protective resistors connected in series therebetween, and said second ends of the remaining electrodes being connected to said second terminal with one of said protective resistors connected in series therebetween.

6. The safety type electric field curtain apparatus of claim 8 wherein said electrodes and said protective resistors are formed of conductive plastic filaments.

7. The safety type electric field curtain apparatus of claim 8 wherein first second and third terminals are provided for connecting said electrodes to a three phase A.C. power source, said second minimum A.C. ignition resistance value being determined by applying the square root of one third times the phase voltage applied between electrodes.

8. The safety type electric field curtain apparatus of claim 12 wherein said electrodes are provided with opposed first and second ends and each of said electrodes is referenced by counting from one of a parallel array of said electrodes:
- said first end of electrode number one being connected to said first terminal with one of said protective resistors connected in series therebetween, the first end of every additional sixth electrode being so connected;
- said second end of electrode number two being connected to said third terminal with one of said protective resistors connected in series therebetween, the second end of every additional sixth electrode being so connected;
- said first end of electrode number three being connected to said second terminal with one of said protective resistors connected in series therebetween, the first end of every additional sixth electrode being so connected;
- said second end of electrode number four being connected to said first terminal with one of said protective resistors connected in series therebetween, the second end of every additional sixth electrode being so connected;
- said first end of electrode number five being connected to said third terminal with one of said protective resistors connected in series therebetween, the first end of every additional sixth electrode being so connected; and
- said second end of electrode number six being connected to said second terminal with one of said protective resistors connected in series therebetween, the second end of every additional sixth electrode being so connected.

9. The safety type electric field curtain apparatus of claim 12 wherein said electrodes are provided with a center and opposed first and second ends and each of said electrodes is referenced by counting from one of a parallel array of electrodes:

said second end of electrode number one being connected to said third terminal with one of said protective resistors connected in series therebetween, every second end of every additional third electrode being so connected;

said center of electrode number two being connected to said first terminal with one of said protective resistors connected in series therebetween, every center of every additional third electrode being so connected; and said first end of electrode number three being connected to said second terminal with one of said protective resistors connected in series therebetween, every first end of every additional third electrode being so connected.

10. The safety type electric field curtain apparatus of claim 3 wherein N terminals are provided for connecting said electrodes to a multi-phase A.C. source having N phases.

11. A method for preventing grounded arc or interelectrode arc ignition of a violently explosive mixture of powder to be processed in an electric field curtain apparatus having an array of parallel electrodes comprising the steps of:

connecting a spark gap in parallel to an equivalent ground capacitance;

dispensing a powder to be processed in the spark gap;

connecting an adjustable test resistance in series with the equivalent ground capacitance;

applying the maximum voltage to be used between ground and the electrodes of the electric field curtain apparatus across the series connection of the ground capacitance and the test resistance; and adjusting the test resistance until the powder to be processed is no longer ignitable, the resistance at which the powder is no longer ignitable being designated the first minimum A.C. ignition resistance to be connected in series with each of the electrodes of the electric field curtain apparatus to prevent grounded body arc ignition.

12. The method of claim 11 further including the steps of:

connecting said first minimum A.C. ignition resistance in series with said adjustable test resistance; and repeating the steps of the method recited in claim 16 with an equivalent interelectrode capacitance and the maximum voltage to be used between the electrodes of the electric field curtain apparatus, the test resistance at which the powder to be processed in no longer ignitable being designated a second minimum A.C. ignition resistance to extend the length of each of the electrodes of the electric field curtain apparatus to prevent interelectrode arc ignition.

13. The method of claim 11 further including the steps of:

choosing various equivalent capacitances;

repeating the steps recited in claim 17 for each equivalent capacitance; and plotting voltage versus minimum A.C. ignition resistance for each equivalent capacitance to provide a reference for when protective resistances which prevent grounded body arc or interelectrode arc ignition of the powder to be processed in an electric field curtain apparatus.

* * * * *

UNITED STATES PATENT AND TRADEMARK OFFICE
CERTIFICATE OF CORRECTION

PATENT NO. : 4,205,359          Page 1 of 2

DATED : May 27, 1980

INVENTOR(S) : Masahiro Yamamoto; Yasunari Okamoto; Tsutomu Itoh; Senichi Masuda

It is certified that error appears in the above-identified patent and that said Letters Patent are hereby corrected as shown below:

Column 6, line 43:
"n" should be --$\underline{n}$--;

Column 9, line 31:
insert --of the-- after "value";

Column 9, line 41:
Delete ", subsequently" and insert
--. Subsequently,--

Column 12, line 46:
"$\sqrt{1/3}$" should be $\sqrt{1/3}$ --;

Column 15, line 44:
"6" should be --1--;

Column 15, line 50:
"6" should be --1--;

Column 15, line 68:
"7" should be --2--;

Column 16, line 10:
"8" should be --3--;

Column 16, line 20:
"8" should be --3--;

Column 16, line 23:
"8" should be --3--;

UNITED STATES PATENT AND TRADEMARK OFFICE
CERTIFICATE OF CORRECTION

PATENT NO. : 4,205,359

DATED : May 27, 1980

INVENTOR(S) : Masahiro Yamamoto et al.

It is certified that error appears in the above—identified patent and that said Letters Patent is hereby corrected as shown below:

Column 16, line 30:
  "12" should be --7--;

Column 16, line 65:
  "12" should be --7--;

Column 18, line 13:
  "13" should be --11-;

Column 18, line 26:
  "17" should be --12--.

Signed and Sealed this

Tenth Day of March 1981

[SEAL]

Attest:

RENE D. TEGTMEYER

Attesting Officer  Acting Commissioner of Patents and Trademarks